United States Patent [19]
Brassil et al.

[11] Patent Number: 6,086,706
[45] Date of Patent: Jul. 11, 2000

[54] DOCUMENT COPYING DETERRENT METHOD

[75] Inventors: John T. Brassil, Berkeley Heights; Steven H. Low, Bridgewater; Nicholas F. Maxemchuk, Mountainside; Lawrence P. O'Gorman, Madison, all of N.J.

[73] Assignee: Lucent Technologies Inc., Murray Hill, N.J.

[21] Appl. No.: 08/170,619

[22] Filed: Dec. 20, 1993

[51] Int. Cl.[7] .................................................. B32B 31/00
[52] U.S. Cl. ......................... 156/277; 235/375; 235/385; 235/454; 283/901; 360/33.1; 360/46
[58] Field of Search .................................. 235/457, 382, 235/454, 488, 490, 375, 385; 358/296, 76, 450, 452, 335; 360/33.1, 19.1, 35.1, 37.1, 46

[56] References Cited

U.S. PATENT DOCUMENTS

| | | | |
|---|---|---|---|
| 4,837,425 | 6/1989 | Edwards | 235/457 |
| 4,983,817 | 1/1991 | Dolash et al. | 235/491 |
| 5,047,864 | 9/1991 | Fujito | 388/296 |
| 5,097,348 | 3/1992 | Suetaka | 358/335 |
| 5,363,202 | 11/1994 | Udgawa et al. | 358/501 |
| 5,367,148 | 11/1994 | Storch | 235/375 |
| 5,388,194 | 2/1995 | Vogel . | |

*Primary Examiner*—Merrick Dixon

[57] ABSTRACT

The present invention is directed to a method of deterring the illicit copying of electronically published documents. It includes utilizing a computer system to electronically publish a plurality of copies of a document having electronically created material thereon for distribution to a plurality of subscribers and operating programming within the computer system so as to perform the identification code functions. The steps are to encode the plurality of copies each with a separate, unique identification code, the identification code being based on a unique arrangement of the electronically created material on each such copy; and, creating a codebook to correlate each such identification code to a particular subscriber. In some embodiments, decoding methods are included with the encoding capabilities. The unique arrangement of the electronically created material may be based on line-shift coding, word-shift coding, or feature enhancement coding (or combinations of these) and may be effected through bitmap alteration of document format file alteration.

25 Claims, 8 Drawing Sheets

FIG. 4

```

Encodes line spacing in a postscript file codeword[]=0,1,0,0,-1,0,-1,0,1,0,0        #codeword
    spacing = 2                                #excess spacing in pixels open original_postscript_file
      get (page) {                             #get next page
        line_count = 0
        get (line) {                           #get next line
          linecount = linecount + 1            #keep track of line number
          y_coordinate = y_coordinate + (codeword[linecount] * spacing)
                                               #change line position if required
          write (line)                         #write line to modified postscript file
        }
      }
```

FIG. 5

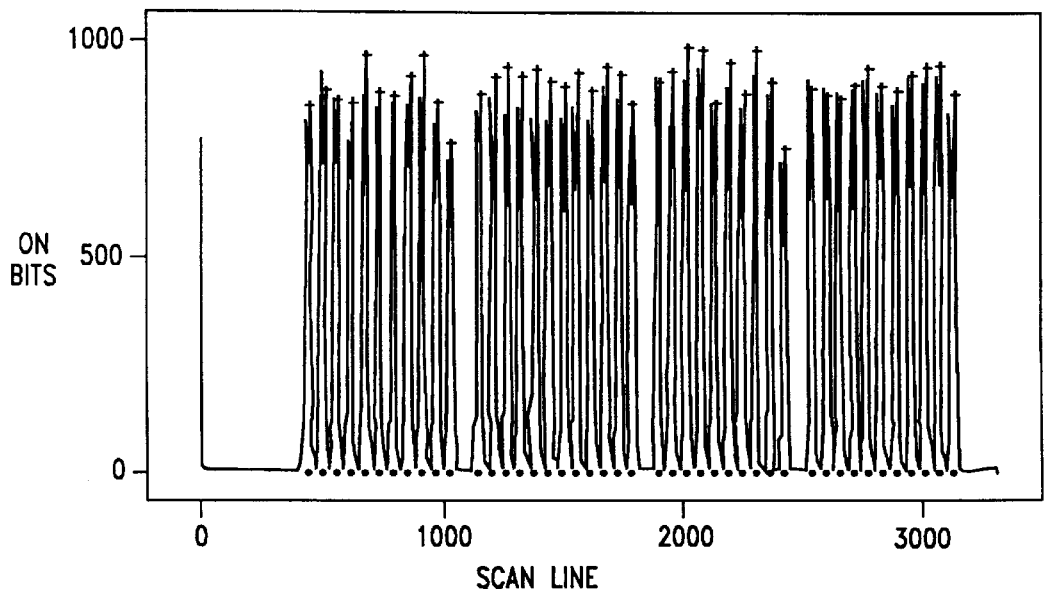

FIG. 7

This is a method of altering a document by vertically shifting the location of text lines to uniquely encode the document. The encoding is most easily applied to the format file. The embedded code word may be decoded from the format file or bitmap.

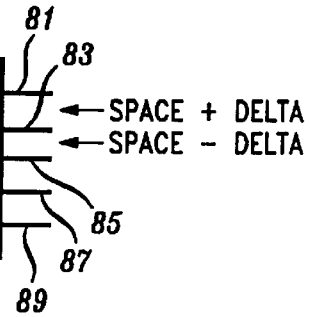

FIG. 8

|Now |is |the |time |for |all |men/women |to ...
|Now |is |the |time |for |all |men/women |to ...

FIG. 9

Now is the time for all men/women to ...

Now is the time for all men/women to ...

FIG. 10

| ;S AND HEORY | 1 | Incremental Mod by John H. Mulle |
| STEMS | 20 | A Unified Framev by J. A. Brzozov |

FIG. 11

| ;S AND HEORY | 1 | Incremental Mod by John H. Mulle |
| STEMS | 20 | A Unified Framev by J. A. Brzozov |

FIG. 12

| ;S AND HEORY | 1 | Incremental Mod by John H. Mulle |
| STEMS | 20 | A Unified Framev by J. A. Brzozov |

FIG. 13

| FONT SIZE (PTS.) | LINE SHIFT (PIXELS) | BASELINE DETECTION RESULTS | CENTROID DETECTION RESULTS |
|---|---|---|---|
| 8 | 1<br>2<br>3 | 18/23 CORRECT, 5 UNCERTAIN<br>23/23 CORRECT<br>23/23 CORRECT | 23/23 CORRECT<br>23/23 CORRECT<br>23/23 CORRECT |
| 10 | 1<br>2<br>3 | 21/21 CORRECT<br>21/21 CORRECT<br>21/21 CORRECT | 21/21 CORRECT<br>21/21 CORRECT<br>21/21 CORRECT |
| 12 | 1<br>2<br>3 | 18/19 CORRECT, 1 ERROR<br>19/19 CORRECT<br>19/19 CORRECT | 19/19 CORRECT<br>19/19 CORRECT<br>19/19 CORRECT |

FIG. 14

| COPY # | BASELINE DETECTION RESULTS | CENTROID DETECTION RESULTS |
|---|---|---|
| 3 | 20 CORRECT, 1 UNCERTAIN | 21/21 CORRECT |
| 4 | 19 CORRECT, 1 ERROR, 1 UNCERTAIN | 21/21 CORRECT |
| 5 | 21 CORRECT | 21/21 CORRECT |
| 6 | 19 CORRECT, 1 ERROR, 1 UNCERTAIN | 21/21 CORRECT |
| 7 | 18 CORRECT, 1 ERROR, 2 UNCERTAIN | 21/21 CORRECT |
| 8 | 16 CORRECT, 1 ERROR, 4 UNCERTAIN | 21/21 CORRECT |
| 9 | 19 CORRECT, 2 ERRORS | 21/21 CORRECT |
| 10 | 19 CORRECT, 1 ERROR, 1 UNCERTAIN | 21/21 CORRECT |

DOCUMENT COPYING DETERRENT METHOD

BACKGROUND OF THE INVENTION

1. Field of the Invention

The present invention involves methods of deterring illicit copying of electronically published documents by creating unique identification codes specific to each subscriber. Each copy of the published document has a unique arrangement of electronically created material, e.g. print material or display material, which is not quickly discernable to the untrained human eye. These unique identification codes discourage illicit copying and enable a publisher/copyright owner to analyze illicit copies to determine the source subscriber.

2. Detailed Background

When the quality of reproductions from copy machines became comparable with the original, the cost of copies was reduced to a few pennies per page, and the time it took to copy a page was reduced to a second or less, then copy machines started to present a threat to publishers. The problem is intensified in the electronic domain. The quality of a reproduction is identical with the original, there is almost no cost associated with making the copy, and with a single keystroke, hundreds of pages can be copied in a fraction of a second. In addition, electronic documents can be distributed to large groups, by electronic mail or network news services, with almost no effort on the part of the sender.

The ability to easily and inexpensively copy and distribute electronic documents is considered to be the main technical problem that must be overcome before electronic publishing can become a viable alternative to conventional publishing. Preventing an individual from duplicating a file of data that is in his possession is an extremely difficult, if not impossible task. Instead of trying to prevent duplication of general data files, the present invention is directed to making electronic publishing more acceptable by making it possible to identify the original owner of a bitmap version of the text portion of a document. With the current copyright laws, the present invention should be adequate to discourage much of the copying and distribution that might otherwise occur. An interesting result of the present invention method is that a publisher or copyright owner can also determine who the original belonged to when reproduced copies are found.

SUMMARY OF THE INVENTION

The present invention is directed to a method of deterring the illicit copying of electronically published documents. It includes utilizing a computer system to electronically publish a plurality of copies of a document having electronically created material thereon for distribution to a plurality of subscribers and operating programming within the computer system so as to perform the identification code functions. The steps are to encode the plurality of copies each with a separate, unique identification code, the identification code being based on a unique arrangement of the electronically created material on each such copy; and, creating a codebook to correlate each such identification code to a particular subscriber. In some embodiments, decoding methods are included with the encoding capabilities. The unique arrangement of the electronically created material may be based on line-shift coding, word-shift coding, or feature enhancement coding (or combinations of these) and may be effected through bitmap alteration or document format file alteration.

BRIEF DESCRIPTION OF THE DRAWINGS

The present invention is more fully understood when the present invention specification herein is taken in conjunction with the drawings appended hereto, wherein:

FIG. 4 are pseudocodes for simple line spacing encoder operations for PostScript files;

FIG. 5 shows a profile of a recovered document using text line-shift encoding;

FIG. 7 illustrates line-shift encoding with line space measurements shown qualitatively;

FIG. 8 shows word-shift encoding with vertical lines to emphasize normal and shift word spacing;

FIG. 9 illustrates the same text as in FIG. 8 but without vertical lines to demonstrate that both unshifted and shifted word spacing appears natural to the untrained eye;

FIG. 10 shows an example of text of a document with no feature enhancement;

FIG. 11 shows the FIG. 10 text with feature enhancement;

FIG. 12 illustrates the FIG. 11 text with the same features enhanced with exaggeration;

FIG. 13 shows a comparison of baseline and centroid detection results as line spacing and font size are varied;

FIG. 14 shows a comparison of baseline and centroid detection as a text page is recursively copied. The results are for 10 point font size with a single pixel spacing.

DETAILED DESCRIPTION OF THE PRESENT INVENTION

One object and general purpose of techniques of the present invention is to provide a means of discouraging the illegitimate copying and dissemination of documents. In the present invention methods, document marking embeds a unique identification code within each copy of a document to be distributed, and a codebook correlating the identification code to a particular subscriber (recipient) is maintained. Hence, examination of a recovered document (or in certain cases, a copy of a distributed document) reveals the identity of the original document recipient.

Document marking can be achieved by either altering text formatting, i.e. lines, words, or groups of characters, or by altering certain characteristics of textual elements (e.g. altering individual characters). The alterations used in marking a document in the present invention method enables the publisher to:

(1.) embed a codeword that can be identified for security (traceability) purposes, and (2.) alter features with as little visible change of appearance as possible.

Certain types of markings can be detected in the presence of noise, which may be introduced in documents by printing, scanning, plain paper copying, etc.

"Encoded" documents using the present invention methods, can provide security in several possible ways, including the following:

(1.) A document can be coded specifically for each site, subscriber, recipient, or user (hereinafter referred to as "subscriber"). Then, any dissemination of an encoded document outside of the intended subscriber may be traced back to the intended subscriber.

(2.) A document code can mark a document as legitimately matched to a specific installation of a user interface (e.g. a particular subscriber computer workstation). If an attempt is made to display a document unmatched to this interface, then that interface can be configured in such a way as to refuse display of the document.

1. Overview of Applications

Figure 1:
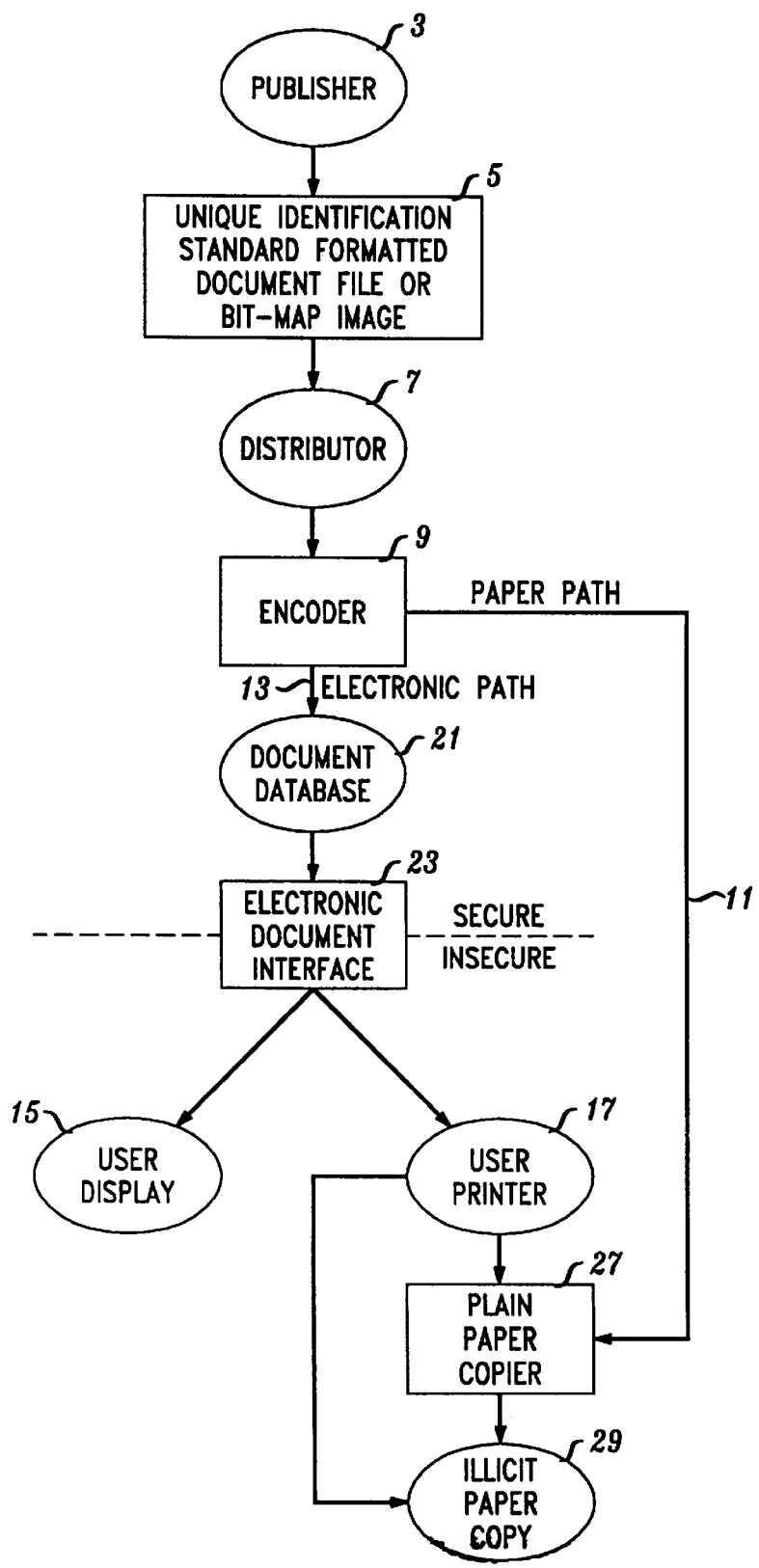
FIG. 1 illustrates a flow diagram of an overview of preferred embodiments of the present invention methods.

An overview of document production, distribution, and user interaction according to the present invention is illustrated in FIG. 1. This shows three paths a document can follow from the publisher 3 to a user. The first is the regular paper copy distribution channel 11 (i.e. a user receives a paper journal, etc. from the publisher). The second and third paths are electronic dissemination 13 via document database 21 and electronic document interface 23, for user display 15 or through a user printer 17 to create a printed document. Whether from the paper copy distribution channel 11 or from the user printer 17, plain paper copier 27, for example, may be then used to create illicit paper copy 29. Variations could, of course, be made to the flow chart of FIG. 1 without exceeding the scope of the present invention. For example, an illicit user could scan a legal version with a scanner and then electronically reproduce illicit copies. The present invention methods cover documents that are applicable along any of these or similar types of distribution paths, e.g. published electronically and distributed via fax, via radio communication computer, etc. Document coding is performed prior to document dissemination as indicated by encoder 9.

Figure 2:
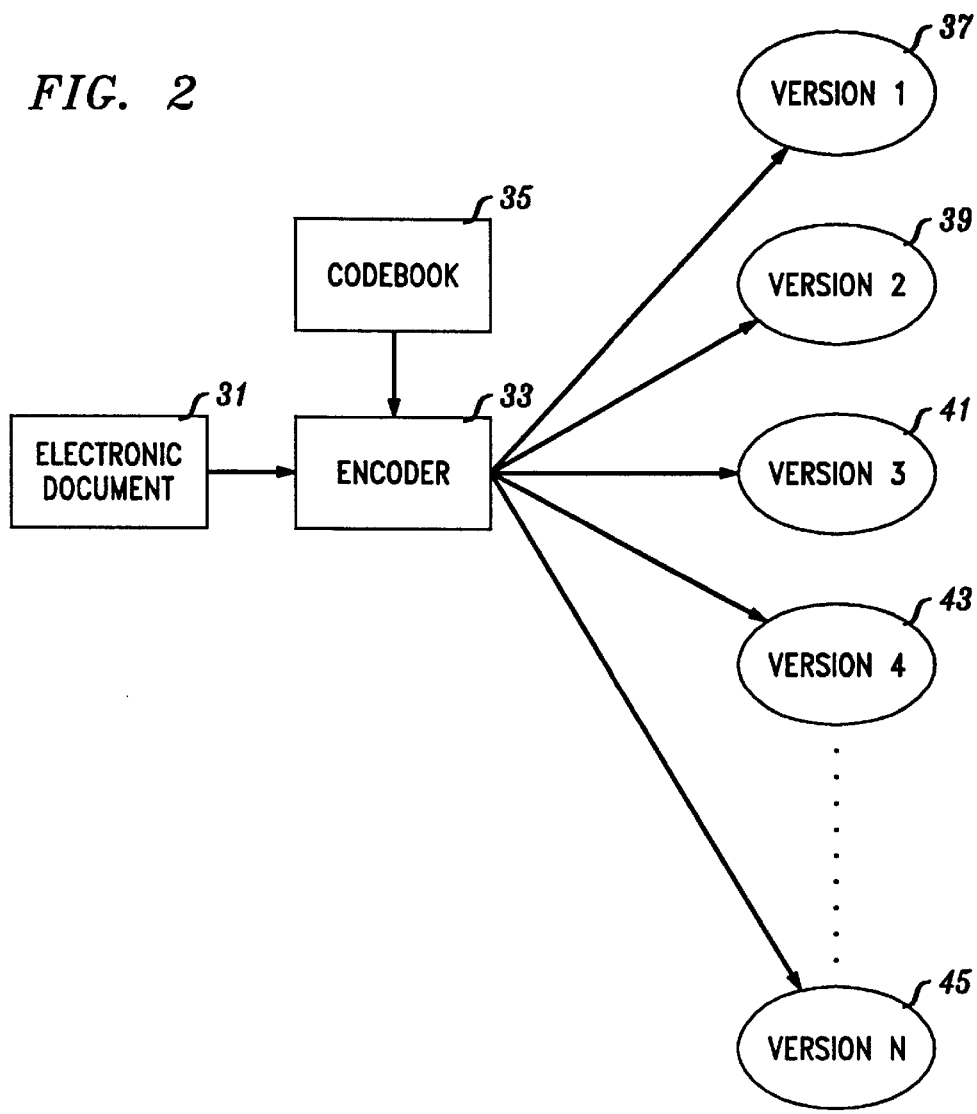
FIG. 2 illustrates a flow diagram of an encoder operation in a present invention method.

Documents are encoded while still in electronic form (FIG. 2). The techniques to encode documents may be used in either of the two following forms: images or formatted document files. The image representation describes each page (or sub-page) of a document as an array of pixels. The image may be black and white (also called bitmap), grayscale, or color. In the remainder of this text, the image representation is simply referred to as a "bitmap", regardless of the image color content. The formatted document file representation is a computer file describing the document content using such standard format description languages as PostScript, troff, SGML, etc.

In a typical application, a bitmap is generated from a formatted document file. The coding technique(s) used in the present invention to mark a document will depend in part on the original format supplied to the encoder, and the format that the subscriber sees. It is assumed that once a subscriber sees a document (e.g. displays a page on a workstation monitor), then he or she can capture and illegitimately disseminate that document. Therefore, coding must be embedded before this subscriber stage. Thus, as in FIG. 2, the electronic document 31 is encoded at encoder 33 according to a preselected set of alterations set up in codebook 35. (It is not essential that the codebook predate the encoding, in some embodiments, the codebook may be created from logging of identification codes as used, to correlate these to specific subscribers, or vice versa.) The encoded documents are each uniquely created as version 1 (37), version 2 (39), version 3 (41), version 4 (43) . . . through version N (45).

A variety of encoding techniques may be used in the present invention methods and these relate to altering lines, words or character features (or combinations) without the need to add textual, graphical, alphabetical, numerical or other unique identifiers, and to thereby not alert an illicit copier to the code. Thus, common to all methods is that the codeword is embedded in the document by altering particular aspects of already existing features. For instance, consider the codeword 1101 (binary). Reading this code right to left from the least significant bit, the first document feature is altered for bit 1, the second feature is not altered for bit 0, and the next two features are altered for the two 1 bits. It is the type of feature that distinguishes each particular encoding method:

(1.) Line-Shift Coding—a method of altering the document format file by shifting the locations of text-lines to uniquely encode the document. This code may be decoded from the format file or bitmap. Lines may be dithered horizontally or vertically, for example. The method provides the highest reliability among these methods for detection of the code even in images degraded by noise.

(2.) Feature-Enhancement Coding—a method of altering a document bitmap image by modifying certain textual element features to uniquely encode the document. One example of such a modification is to extend the length of character ascenders. Another is to narrow character width; another is to remove or shorten a character section. This type of code is encoded and decoded from the bitmap image.

(3.) Word-Shift Coding—a method of altering the document format file or image bitmap by shifting the locations of words within the text to uniquely encode the document. This coding may be decoded from the format file or bitmap. This method in preferred embodiments using document format file alteration is similar in use to method (1). It typically provides less visible alteration of the document than method (1), but decoding from noisy image may be less easily performed.

A detailed discussion will now follow regarding each of the above three encoding techniques.

2.1 Text-Line Coding

This is a coding method that is applied to a formatted document file. In the following discussion, it is assumed that the formatted document file is in Adobe Systems, Incorporated PostScript—the most common Page Description Language Format used today. However, the present invention is also applicable to other document file formatting programs. PostScript describes the document content a page at a time. Simply put, it specifies the content of a text-line (or text-line fragment such as a phrase, word, or character) and identifies the location for the text to be displayed. Text location is marked with an x-y coordinate representing a position on a virtual page. Depending on the resolution used by the software generating PostScript, the location of the text can be modified by as little as 1/720 inch (1/10 of a printer's "point"). Most laser printers in common use today have somewhat less resolution (e.g. 1/300 inch).

In one embodiment of the present invention method, prior to distribution, the original PostScript document and the codeword are supplied to an encoder. The encoder reads the codeword, and searches for the lines which are to be moved. Upon finding a line to be moved, the encoder modifies the original (unspaced) PostScript file to incorporate the line spacing adjustments. This is done by increasing or decreasing the y coordinate of the line to be spaced. The encoder output is an "encoded" PostScript document ready for distribution in either electronic or paper form to a subscriber.

Figure 3:
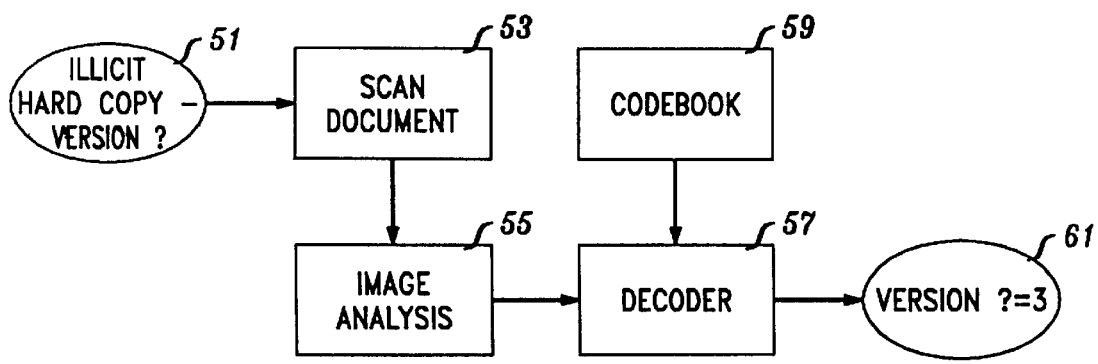
FIG. 3 illustrates a flow diagram of a decoder operation in a present invention method.

FIG. 3 illustrates how a publisher may identify the original recipient (subscriber) of a marked document by analysis of a recovered paper copy of the document. That is, given a questionable hard copy 51, copy 51 is scanned by scanner 53, analyzed by computer 55, decoded with decoder program 57, matched to codebook 59, to determine the source or subscriber version 61. For example, the "decoder" analyzes the line spacing, and extracts the corresponding codeword, uniquely identifying the original subscriber.

A page (or pages) of the illicit copy of the document may be electronically scanned to produce a bitmap image of the page. The bitmap image may preferably be subjected to noise reduction to remove certain types of extraneous markings (i.e. noise introduced by printing a hard copy, plain paper copying, electronic scanning, smudges, etc.). The bitmap image may then be rotated to ensure that the text lines are perpendicular to the side page edge. A "profile" of the page is found—this is the number of bits on each horizontal scan line in the image. The number of such scan lines varies, but in our experiment, the number of lines is around 40 per text-line. The distance between each pair of adjacent text-line profiles may then be measured. This is done by one of two approaches—either the distance between the baselines of adjacent line profiles is measured, or the difference between centroids (i.e. centers of mass) of adjacent line profiles is measured. The interline spacings are then analyzed to determine if spacing has been added or subtracted. This process, repeated for every line, determines the codeword of the document—this uniquely determines the original subscriber.

Advantages of this method relative to the other present invention methods, are as follows:

The code can be decoded without the original; Decoding is quite simple;

It is likely to be the most noise resistant technique. However, this method is likely to be most visible of coding techniques described herein.

FIG. 4 illustrates a simple line spacing encoder pseudocode for PostScript files.

FIG. 5 shows a graph of a line spacing profile of a recovered document page. The scan line of the baseline of each text-line is marked with a "+". The scan line of the centroid of each text-line is marked with a dot. Decoding a page with a line spacing may involve measuring the distance between adjacent text-line centroids or baselines and determining whether space has been increased, decreased, or left the same as the standard.

2.2 Feature Enhancement Coding

This is a present invention coding method that is applied directly to the bitmap image of the document. The bitmap image is examined for chosen features, and those features are altered, or not altered, depending on the codeword. These alterations may be widening, narrowing, slanting, subtracting from, or adding to the features of the individual characters. For example, upward, vertical endlines of letters—that is, the tops of letters, b, d, h, etc. may be extended. These endlines are altered by extending their lengths by one (or more) pixels, but not otherwise being changed.

This coding is applied upon the bitmap image, and can be detected upon the printer image. With more emphasized coding than suggested below, or with redundancy in the coding, it may also be detected in scanned images of printed and photocopied documents.

Advantages of this present invention method are as follows:

There are a very large number of code possibilities (perhaps 10 times more than for word-shift coding and 20 times more than for line-shift coding);

The coding is performed on the bitmap of the document, thus there is no need for altering the formatted document file;

This is one of the least visible methods of coding the image;

Disadvantages include:

This is primarily an image coding technique and is not normally applicable to the format file (the other techniques are more readily applicable to both);

This method may be less applicable to photocopied, or otherwise noisy documents, due to the visibility of the coding when applied with such magnitude (length) as to also be noise-intolerant;

This code cannot be detected without the original.

Figure 6:
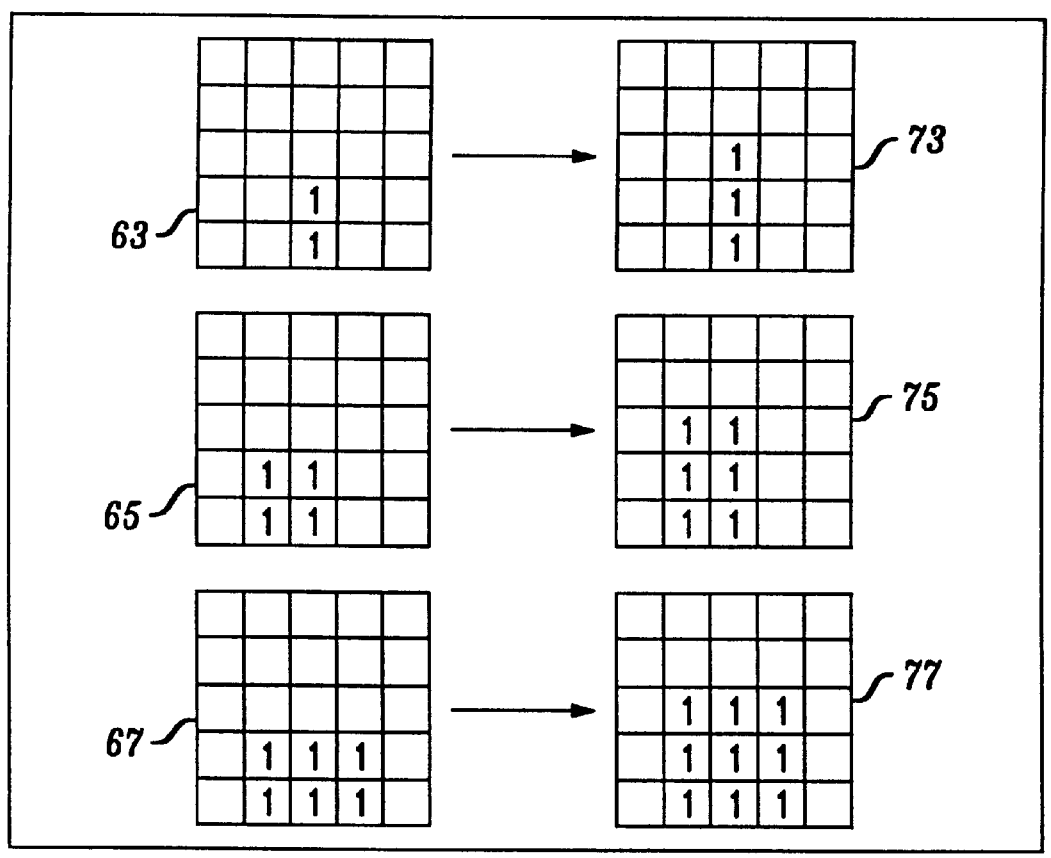
FIG. 6 illustrates three examples of feature enhancing in a 5×5 pixel array.

The pseudocodes for coding and decoding may be as follows, with reference to FIG. 6, which shows three examples of normal coding 63, 65 and 67, and enhanced coding 73, 75 and 77 of a 5×5 pixel array:

CODING:

```
mask off the least significant codeword bit and right-
     shift the codeword
for each pixel in image in chosen order (e.g. raster-
     scan order)
{
  examine k × k (e.g. 5 × 5) neighborhoods of pixels
     around this center pixel
  if the pattern of pixels within the k × k mask
          matches one of the chosen features as in
          FIG. 6
  {
    then if codeword bit is 1, alter feature as in
  FIG. 6
    else if codeword bit is 0, leave feature as is
    store (x,y) location of center pixel and 1 or 0 value
  of codeword bit
    if codeword = 0, break
    else mask next codeword bit and
    right-shift
  }
}
```

DECODING:

```
read in list of codeword bits and corresponding center
     pixel locations
          where coding has been performed on original
          image
set codedImage = 1
for each (x,y) location of coded feature
{
  examine k × k neighborhood of pixels around center
     pixel location
  if k × k region matches altered pattern and codeword
     bit is 0
     or if pixels have not been altered pattern and
          codeword bit is 1
   then codedImage = 0, break
}
if codedImage = 1, then image matches code
if codedImage = 0, then image does not match code
```

2.3 Word-Shift Coding

This is a coding method that is applicable to documents with variable spacing between adjacent words. This encoding is most easily applied to the format file. For each text-line, the largest and smallest spacings between words are found. To code a line, the largest spacing is decremented by some amount and the smallest is augmented by the same amount. This maintains the overall text-line length, and produces little qualitative change on the text image.

Advantages of this method relative to other present invention methods are as follows:

It is one of the least visible methods of coding the image;
The code cannot be decoded without the original;

Disadvantages include:

The code cannot be decoded without the original;

The pseudocode is as below:

```
CODING:

mask off the least significant codeword bit and right-
shift the codeword
for each text line in the format file
{
  if the code bit is 1
  {
    find the longest space between words
    find the shortest space between words
    shorten longest space and lengthen shorter space
      by a chosen amount (must be <= longest space-
      shortest space)
    store text-line number, altered space positions,
and codebit
    if codeword = 0, break
    else mask next codeword bit and
    right-shift
  }
}
DECODING:

read in list of codeword bits and corresponding line
numbers
        and space locations in text-lines
          where coding has been performed on original
          image
set codedImage = 1
for each text-line in coded formatted file and original
formatted file
{
  if codeword bit for a text-line is 1
  then
    if coded spaces in coded image are not
different from corresponding
      spaces in original image
    then codedImage = 0, break
}
if codedImage = 1, then image matches code
else if codedImage = 0, then image does not match code
```

2.4 Illustrative Review of Altering Techniques

FIG. 7 illustrates an example of line-shift encoding. Note that the second line 83 is shifted down from first line 81 by approximately 1/150 inch, which equals delta. Due to differential coding, this causes the spacing between the first line 81 and the second line 83 to be greater than normal and the spacing between second line 83 and third line 85 to be less than normal. The spaces between third line 85, fourth line 87 and fifth line 89 are normal.

FIGS. 8 and 9 illustrate word-shift encoding. FIG. 8 shows vertical lines 91, 93, 95, 97, 99, 101, 103, 105 and 107. These lines are vertical guidelines to show the positioning of each of the words in the top and bottom lines of FIG. 8. The word "for" has intentionally been shifted and, therefore, rests at vertical line 99 in the bottom line of text and against vertical line 101 in the top line of text. FIG. 9 shows the same text as in FIG. 8, but without the vertical lines to demonstrate that both unshifted and shifted word spacing appears natural to the untrained eye.

FIGS. 10, 11 and 12 illustrate feature enhancement encoding. FIG. 10 shows characters of text which have not been altered and would typically represent the standard or reference document. FIG. 11 shows the same document but with feature enhancement added. Note, for example, that "1" has been vertically extended as have the letters "t", "l", and "d" in the first line as well as other characters elsewhere. FIG. 12 shows the same feature enhancements as in FIG. 11, but with exaggeration to simply emphasize the enhancement. Based on FIGS. 11 and 12, an appropriate codeword for the enhanced feature documents would be 5435 decimal.

3. Application of Error Correction

Due to noise which may be introduced in the recovered document, the identification process is subject to error. Clever choices of the set of codewords used to space lines (based on Error Correcting Codes) will be used to minimize the chance of detection error. This will establish a tradeoff between the number of potential recipients of a document (i.e. the number of codewords) and the probability of correct identification. To illustrate, the following discussion gives detail of how line-shift decoding may preferably be enhanced by noise removal.

In general, in the present invention methods, a line-shift decoder extracts a codeword from a (possibly degraded) bitmap representation of an encoded document (decoding a recovered, unmodified formatted document file is trivial). An illicit copy of an encoded document may be recovered in either electronic or paper form. If paper is recovered, a page (or pages) of the document is electronically scanned producing a bitmap image of the page(s). Extracting the code from an image file is not as straightforward as doing so from the format file. Since the image contains ON and OFF bits, rather than ASCII text and formatting commands, pattern recognition techniques must be used first to determine the content. Furthermore, since noise may be present, image processing techniques are performed to reduce noise and make the job of pattern recognition more robust. Some of the techniques used for document decoding from the image are as follows:

Salt-and-Pepper Noise Removal—Inking irregularities, copier noise, or just dirt on the paper can cause an image to contain black specks in background areas, and white specks within foreground areas such as text. Since this noise interferes with subsequent processing, it is desirable to reduce it as much as possible.

A kFill filter is used, which is designed to reduce salt-and-pepper noise while maintaining document quality. It does so by discriminating noise from true text features (such as periods and dots) and removing the noise. It is a conservative filter, erring on the side of maintaining text features versus reducing noise when those two conflict and has been described for document clarification and is known by the artisan.

Deskewing—Each time that paper documents are photocopied and scanned, the orientation of the text lines on the page may be changed from horizontal because of misorientation—skewing—of the page. In addition, a photocopier may also introduce skewing due to the slight non-linearity of its optics. The success of subsequent processing requires that this skew angle be corrected—that the text lines be returned to the horizontal in the image file.

One approach for deskewing by use of the document spectrum, or docstrum, technique is a bottom-up segmentation procedure that begins by grouping characters into words, then words into text lines. The average angle of the text lines is measured for a page, and if this is non-zero (not horizontal), then the image is rotated to zero skew angle. Rotation, followed by bilinear interpolation to achieve the final deskewed image is a standard digital image processing procedure that can be found in the published literature.

Text-Line Location—After deskewing, the locations of the text lines can be found. A standard document processing technique called the projection profile is used. This is simply a summation of the ON-valued pixels along each row. For a document whose text lines span horizontally, this profile will have peaks whose widths are equal to the character height and valleys whose widths are equal to the white space between adjacent text lines. The distances between profile peaks determine interline spacing.

In one preferred embodiment, the present invention line-shift decoder measures the distance between each pair of adjacent individual text line profiles (within the page profile). This is done by one of two approaches—either by measuring the distance between the baselines of adjacent line profiles, or by measuring the difference between centroids of adjacent line profiles, as mentioned above. A baseline is the logical horizontal line on which characters sit; a centroid is the center of mass of a text line. As seen in FIG. 5, discussed above, each text line produces a distinctive profile with two peaks, corresponding to the midline and the baseline. The peak in the profile nearest the bottom of each text line is taken to be the baseline; if equal peak values occur on neighboring scan lines, the largest value scan line is chosen as the baseline scan line. To define the centroid of a text line precisely, suppose the text line profile runs from scan line y, y+1, . . . , to y+w, and the respective number of ON bits/scan line, are h(y), h(y+1), . . . , h(y+w). Then the text line centroid is given by $$\frac{yh(y) + \cdots + (y+w)h(y+w)}{h(y) + \cdots + h(y+w)}$$

The measured interline spacings (i.e. between adjacent centroids or baselines) are used to determine if white space has been added or subtracted because of a text line shift. This process, repeated for every line, determines the codeword of the document—this uniquely determines the original recipient.

The decision rules for detection of line shifting in a page with differential encoding are described. Suppose text lines i−1 and i+1 are not shifted and text line i is either shifted up or down. In the unspaced document, the distance between adjacent baselines, or baseline spacings are the same. Let $s_{i-1}$ and $s_i$ be the distances between i−1 and i, and between baselines i and i+1, respectively. Then the decision rule is:

if $s_{i-1} > s_i$: decide line i shifted down if $s_{i-1} < s_i$: decide line i shifted up otherwise: uncertain Baseline Detection Decision Rule: (3.2)

Unlike baseline spacings, centroid spacings between adjacent text lines in the original unspaced document are not necessarily uniformly spaced. In centroid-based detection, the decision is based on the difference of centroid spacings in the spaced and unspaced documents. More specifically, let $s_{i-1}$ and $s_i$ be the centroid spacings between lines i−1 and i, and between lines i and i+1, respectively, in the spaced document; let $t_{i-1}$ and $t_i$ be the corresponding centroid spacings in the unspaced document. Then the decision rule is:

if $S_{i-1} - t_{i-1} > si - t_i$: decide line i shifted down otherwise: decide line i shifted up Centroid Detection Decision Rule: (3.3)

An error is said to occur if the decoder decides that a text line was moved up (down) when it was moved down (up). In baseline detection, a second type of error exists. The decoder is uncertain if it cannot determine whether a line was moved up or down. Since in the encoding every other line is moved, and this information is known to the decoder, false alarms do not occur.

4.0 Experimental Results

Two sets of experiments were performed. The first set was designed to test how well line-shift coding works with different font sizes and different line spacing shifts in the presence of limited, but typical image noise. The second set test was designed to discover how well a fixed line spacing shift could be detected as document degradation became increasingly severe. The equipment used in both experiments was as follows:

1. Ricoh FS1S 400 dpi Flat Bed Electronic Scanner
2. Apple LaserWriter IIntx 300 dpi laser printer
3. Xerox 5052 plain paper copier.

The printer and copier were selected in part because they are typical of the equipment found in wide use in office environments. The particular machines used could be characterized as being heavily used but well maintained. Xerox and 5052 are trademarks of Xerox Corp. Apple and LaserWriter are trademarks of Apple Computer, Inc. Ricoh and FSI are trademarks of Ricoh Corp.

4.1 Variable Font Size Experiment

The first set of experiments each uses a single-spaced page of text in the Times-Roman font. The page is coded using the differential encoding scheme. In differential encoding, every other line of text in each paragraph was kept unmoved, starting with the first line of each paragraph. Each line between two unmoved lines was always moved either up or down. That is, for each paragraph, the 1st, 3rd, 5th, etc. lines were unmoved, while the 2nd, 4th, etc. lines were moved. Nine experiments were performed using font sizes of 8, 10 or 12 pixels and shifting alternate lines (within each paragraph) up or down by 1, 2, or 3 pixels. Since the printer has a 300 dpi resolution, each pixel corresponds to $\frac{1}{300}$ inch, or approximately one-quarter point. Each coded page was printed on the laser printer, then copied three times. The laser printed page will be referred to as the 0th copy; the nth copy, $n \geq 1$, is produced by copying the n−1st copy. The third copy was then decoded to extract the codeword. That is, the third copy was electronically scanned, the bitmap image processed to generate the profile, the profile processed to generate the text line spacings (both baseline and centroid spacings), and the codeword detected using these measurements and rules (3.2–3).

FIG. 13 presents the results of the variable font size experiment for one page of single-spaced text. Note that as the font size decreases, more lines can be placed on the page, permitting more information to be encoded. Both baseline and centroid approaches detected without error for spacings of at least 2 pixels; the centroid approach also had no errors for a 1 pixel spacing.

Though it is not shown in FIG. 13, it is noteworthy that some variability will occur in the detection performance results, even in repeated "decoding" of the same recovered page. This variability is due in part to randomness introduced in electronic scanning. If a page is scanned several times, different skew angles will ordinarily occur. The skew will be corrected slightly different in each case, causing detection results to vary.

To illustrate this phenomena, the test case (8 point text, 1 pixel spacing) was rescanned 3 additional times. The initial text line skew angle (i.e. before deskewing) differed for each scan. In the three rescans, the following decoding results were observed under baseline detection: 5 uncertain, 3 uncertain and 1 error, and 6 uncertain. Curiously, the line spacings that could not be detected or were in error varied somewhat across the retries. This suggests that there may be some decoding performance gained by scanning a single page multiple times, and combining the results (e.g. averaging).

4.2 Plain Paper Copying Experiment

For the second set of experiments, a single-spaced page is of text was coded using differential encoding. The font was fixed to be Times-Roman, font size to be 10 point, and the coding line-shift to be 1 pixel. Repeated copies (the 0th, 1st, . . . 10th copy) of the page were then made, and each copy used in a separate experiment. Hence, each successive experiment used a slightly more degraded version of the same text page. The experimental results are tabulated in FIG. 14.

No errors were observed through the 10th recursive copy using centroid detection. What is even more remarkable is that less than half the available signal to noise "margin" has been exhausted by the 10th copy. This suggests that many more copies would likely be required to produce even a single error—such a document would be illegible!

FIG. 14 shows that, for baseline decoding, detection errors and uncertainties do not increase monotonically with the number of copies. Further, the line spacings that could not be detected correctly varied somewhat from copy to copy. This suggests that line spacing "information" is still present in the text baselines, and can perhaps be made available with some additional processing.

The results of FIG. 14 report the uncoded error performance of our marking scheme. But the 21 line shifts used in the experiment were not chosen arbitrarily. The codeword comprised 3 concatenated codewords selected from a Hamming block code, a 1-error correcting code. Hence, roughly each ⅓ page was protected from 1 error. Many, but not all, of the errors and uncertainties resulting from baseline decoding would have been corrected by this encoding. However, since uncoded centroid detection performed so well, it is unclear whether there is any need to supplement it with error correction.

5. Discussion and Implications of Image Defects

Image defects resulting from plain paper copying are all too familiar to the reader. The defects most significantly affecting the detection results are now briefly discussed. The discussion is largely qualitative—a more quantitative discussion of image defects and their physical underpinnings is beyond the scope of this overview.

The primary troublesome defect we encountered was text line skew, or the rotation of text lines about a point. In most experiments we observed skew angles between [−3°, +3°]. Text line skew was largely removed by image rotation, albeit at the expense of the introduction of some distortion.

Blurring also increased with the number of copies produced, indeed ultimately making the 10th copy barely legible. Blurring seemed to have surprisingly minor implications in detection performance. Plain paper copies were produced at the copier's nominal "copy darkness" setting; blurring typically increases with copy darkness. As the number of copies increased, darkness generally varied over a page; regions of severe fading were sometimes observed. It is unclear whether blurring or fading is more detrimental to decoding performance.

Expansion or shrinking of copy size is another potential problem. It is not unusual to discover a 4% page length or width change after 10 copies. Further, expansion along the length and width of a page can be markedly different. Copy size changes forced us to use differential encoding—that is, encoding information in the relative rather than absolute shifts between adjacent text lines.

Simple inspection of the copies shows both a wide range of horizontal and vertical displacements and other image defects (e.g. salt-and-pepper noise) of little consequence. Perhaps the most startling degradation is "baseline waviness" (i.e. nonconstant skew across a text line). It is remarkable that detection is not dramatically affected by this particular image degradation.

5.1 An Analytical Noise Model

Figure 15:
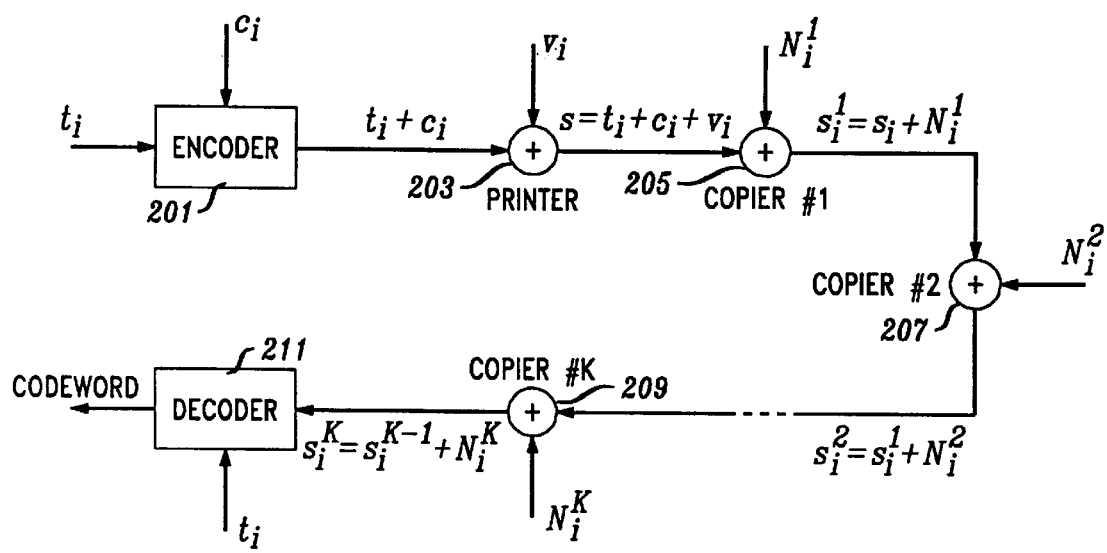
FIG. 15 shows a schematic diagram for a noise accumulation model.

In this subsection, a simple model of the noise affecting text line centroids is presented. There are two types of noise. The first type of noise models the distortions in printing the document; the second type models the distortions in copying. This second type of noise increases with the number of copies while the first type does not. The accumulation of noise is illustrated in FIG. 15.

This illustrates the theoretical model as a document travels from encoder 201, to the original printer 203, first copier 205, second copier 207, the last of a series of copiers, i.e. copier K 209, and then decoder 211.

A page of text with n+1 text lines yields n+1 vertical coordinates $y_1, \ldots, y_{n+1}$, that represent the centroids of the text lines, measured from, say, the top page margin. The centroid spacings, or distance in scan lines between adjacent centroids, are given by $$t_i = y_{i+1} - y_i \; i=1, \ldots, n.$$

Hence, for detecting line-shifts, a page of n+1 text lines is effectively described by n centroid spacings.

In FIG. 15, the ith line spacing shift $c_i$ is positive if extra space has been added, negative if space has been subtracted, and zero otherwise. The printer noise, $v_i$, models the cumulative effect (on the ith centroid spacing) of distortions introduced by printing, scanning and image processing. Making the jth copy adds a random noise $N^j_i$ to the ith centroid spacing. At the decoder input after the Kth copy, the original centroid spacing $t_i + c_i$ has been distorted to be $s_i^K$. Since the physical processes of printing, scanning, and image processing are independent of copying, it is assumed that the random variables $v_i$, i=1, . . . , n, are independent of $N^j_i$, i=1, . . . , n, j=1, . . . , K.

Let a page of n+1 text lines be described by the centroid spacings $t_1, \ldots, t_n$. It is assumed that the printer noise distorts these spacings to $$S_i = t_i + c_i + v_i, \; i=1, \ldots, n \quad (4.1)$$

where $v_i$, i=1, . . . , n, are independent and identically distributed Gaussian random variables. This assumption is supported by the measurements, which yield a mean of $\mu_1 = 0.0528$ pixel and variance of $\delta_1^2 = 0.140 \; pixel^2$.

Next, consider the effect of noise introduced by copying. Consider the 0th copy of a page of n+1 text lines with centroid spacings $S_1, S_n$. Let the first copy of the page be described by centroid spacings $s_1^1, \ldots, s_n^1$, where $$s_i^1 = s_i + N_i^1, \; i=1, \ldots, n. \quad (4.2)$$

Here, $N_i^1$ is the random noise that summarizes the cumulative effect of skewing, scaling, and other photographic distortions in the copying process, on the ith centroid spacing $s_i$. After the jth copy, $j \geq 1$, the centroid spacings are denoted by $s_1^j, \ldots, s_n^j$. As in (4.2), these centroid spacings are given by $$s_i^j = s_i^{j-1} + N_i^j, \; i=1, \ldots, n. \quad (4.3)$$

where $N_i^j$ is the noise introduced by copying the j−1st copy. Hence, the centroid spacing $s_i^j$ is corrupted by the total noise:

$$s_i^j = s_i + (N_i^1 + \ldots + N_i^j). \quad (4.4)$$

The measurements taken suggest a surprisingly simple statistical behavior for the random copier noise. The noise components $N_i^j$, j=1, 2, ..., K, are well modeled by Gaussian random variables with mean $\mu$=0.066 pixel and variance $\delta2$=0.017 pixel². The measurements suggest that the random variables $N_i^1, \ldots, N_i^j$ are also uncorrelated, and by normality, they are thus independent. Hence, the centroid spacing $s_i^j$ on the jth copy is $$s_i^j = s_i + \eta_i^1, \quad i=1, \ldots, n, \quad (4.5)$$

where aid is Gaussian with mean j$\mu$ and variance j$\delta^2$.

Printer noise and copier noise is now combined to estimate the error probability under centroid detection. Consider three adjacent, differentially encoded text lines labeled such that lines i−1 and i+1 are unshifted while line i is shifted (up or down) by |c| pixels. Let $t_{i-1}$ and $t_i$ be the centroid spacings between these lines in the original unspaced document, and let $s_{i-1}$ and si be the corresponding spacings on the 0th copy of the encoded document. Then $$s_{i-1} = t_{i-1} + c + v_{i-1}, \quad (4.6)$$

$$s_i = t_i - c + v_i, \quad (4.7)$$

where c=+1 if line i is shifted down and c=−1 if line i is shifted up. Let $s_{i-1}^j$ and $s_i^j$ be the corresponding centroid spacings on the jth copy of the document. Then $$s_{i-1}^j = t_{i-1} + c + v_{i-1} + \eta_{i-1}^j \quad (4.8)$$

$$s_i^j = t_i - c + v_i + \eta_i^j \quad (4.9)$$

where $\eta_i^j$ are defined in (4.5).

Suppose the jth copy of the document is recovered and is to be decoded. Applying the above (4.8 and 4.9) to the detection rule (3.3): if $v_{i-1} - v_i > \eta_i^j - \eta_{i-1}^j - 2c$: decide line shifted down (4.10)
otherwise: decide line shifted up
Since the random variables $v_{i-1}$, $v_i$, and $\eta_{i-1}^j$, $\eta_i^j$ are mutually independent, the decision variable
$D \triangleq (V_{i-1} - v_i) + (\eta_{i-1}^j - \eta_i^j)$ is Gaussian with zero mean and variance 2($\delta_1^2 + j\delta^2$). Hence, the probability that a given line is decoded in error is $$p(D > -2c | \text{up shift}) = \frac{1}{2}p(D \leq -2c | \text{down shift}) = \frac{1}{2}p(D \leq -2). \quad (4.11)$$

The error probability is easily evaluated using the complementary error function. Using the measurement $\delta_1^2$=0.140 and $\delta^2$=0.017, the error probability is only approximately 2% on the 20th copy.

5.2 Comparison of Baseline and Centroid Detection Algorithms

Detection using either the baseline or centroid of a text line profile offers distinct advantages and disadvantages. As expected, the experimental results reveal that centroid-based detection outperforms baseline-based detection for pages encoded with small line shifts (i.e. 1 pixel) and subject to large distortion. This performance difference arises largely because baseline locations are integer valued, while centroid locations, being averages, are real valued. Recall that baseline locations are determined by detection of a peak in the text line profile. Sometimes this peak is not pronounced— the profile value on scan lines neighboring the baseline are often near the peak value. Hence, relatively little noise can cause the peak to shift to a neighboring scan line. A single scan line shift is sufficient to introduce a detection error when text lines are encoded with a 1 pixel shift.

It also appears likely that centroids are less subject to certain imaging defects than are baselines. Baselines appear relatively vulnerable to line skew (or more precisely, the noise introduced by deskewing). Though centroid detection outperforms baseline detection, the latter has other benefits. In particular, encoded documents can be decoded without reference to the original, unspaced document. A secure document distributor would then be relieved of the need to maintain a library of original document centroid spacings for decoding.

Finally, both detection techniques can be used jointly (and indeed, with other techniques) to provide a particularly robust, low error probability detection scheme.

6. Conclusion

Making and distributing illegitimate copies of documents can be discouraged if each of the original copies is unique, and can be associated with a particular recipient. Several techniques for making text documents unique have been described. One of these techniques, based on text line shifting, has been implemented as a set of experiments to demonstrate that perturbations in line spacing that are small enough to be indiscernible to a casual reader can be recovered from a paper copy of the document, even after being copied several times.

In the experiments, the position of the odd numbered lines within each paragraph remains the same while the even numbered lines are moved up or down by a small amount. By selecting different line shifts, information is encoded into the document. If the document remains in the electronic form throughout the experiment, retrieving the encoded information is trivial. To retrieve the information from a paper copy, the document is scanned back into the computer. Two detection methods have been considered, one based on the location of the bottom of the characters on each line, and the other based on the center of mass of each line. The advantage of using the baselines is that they are equally spaced before encoding and the information can be retrieved without reference to a template. The centers of mass of the lines are not equally spaced, however, this technique has been found to be more resilient to the types of distortion encountered in the printing and copying process.

The differential encoding mechanism has been selected because the types of distortion that have been encountered have canceled out when differences between adjacent lines are considered. In the experiments, the lines in the document are moved up or down by as little as 1/300 inch, the document is copied as many as ten times, then the document is scanned into a computer and decoded. For the set of experiments that have been conducted, the centroid decoding mechanism has provided an immeasurably small error rate.

Obviously, numerous modifications and variations of the present invention are possible in light of the above teachings. It is therefore understood that within the scope of the appended claims, the invention may be practiced otherwise than as specifically described herein.

What is claimed is:

1. A method of deterring illicit copying of electronically published documents, which comprises:
   (a) utilizing a computer system to electronically publish a plurality of copies of a document having electronically created material thereon for distribution to a plurality of subscribers;
   (b) operating programming within said computer system so as to perform the following steps:
      (i) encoding said plurality of copies each with a separate, unique identification code, said identification code being based on a unique arrangement of the electronically created material on each such copy based on line-shift coding, wherein said line-shift coding includes altering a bitmap image of the document to shift locations of at least one line of text relative to other lines of text contained in the document to uniquely encode each copy of the document; and (ii) creating a codebook of a plurality of identification codes to correlate each such identification code to a particular subscriber, whereby illicit copies of a document can be traced to the particular subscriber associated with the identification code within the document.

2. The method of claim 1, wherein operating said programming also includes performing the steps of:

(iii) creating a first copy of said document as a standard document;

(iv) creating a plurality of subsequent copies, each with at least one alteration rendering it different from said standard document, and each being different from one another so that each of said copies has a unique identification code based on said at least one alteration;

(v) comparing each subsequent copy with said standard document to identify a sequence of same and different aspects of each such copy relative to said standard document; and, (vi) converting said sequence of same and different aspects to a unique binary identification code.

3. The method of claim 1, wherein said computer system includes a scanner device connected thereto and operating said programming includes performing the steps of:

(1) scanning a copy of a document to feed its image into said computer system;

(2) analyzing each line of said document for line-shift alterations and decoding the image to determine said images unique identification code; and, (3) comparing said images unique identification code to the codebook to determine the particular subscriber to which the identification code correlates.

4. The method of claim 1 wherein operating said programming includes performing the steps of:

(1) receiving a bitmap image for a copy of a previously electronically published document via an electronic inputting device;

(2) analyzing the bitmap image to determine its unique identification code; and, (3) comparing the resulting identification code analyzed from the bitmap image to the plurality of identification codes in the codebook to determine the particular subscriber to which the identification code correlates.

5. The method of claim 1, wherein operating said programming includes performing the steps of:

(1) receiving a document format file for a copy of a previously electronically published document;

(2) analyzing the document format file to determine its unique identification code; and, (3) comparing the resulting identification code to the codebook to determine the particular subscriber to which the identification code correlates.

6. The method of claim 3 wherein operating said programming also includes the step of noise reduction comprising salt-and-pepper, deskewing and text-line location.

7. The method of claim 3 wherein said analyzing and decoding is based on baseline differential determinations to determine distances between adjacent baselines as to whether a text line has been shifted.

8. The method of claim 3 wherein said analyzing and decoding is based on centroid differential determinations.

9. The method of claim 5 wherein said copy of a document is from a document which has been encoded by line-shift alteration.

10. The method of claim 9 wherein operating said programming also includes the step of noise reduction.

11. The method of claim 9 wherein said analyzing and decoding is based on baseline differential determinations.

12. The method of claim 9 wherein said analyzing and decoding is based on centroid differential determinations.

13. The method of claim 5 wherein said copy of a document is from a document which has been encoded by word-shift alteration.

14. The method of claim 5 wherein said copy of a document is from a document which has been encoded by feature enhancement alteration.

15. A method of deterring the illicit copying of electronically published documents, which comprises:

(a) utilizing a computer system to electronically publish a plurality of copies of a document having electronically created material including words arranged in a predetermined sequence thereon for distribution to a plurality of subscribers;

(b) operating programming within said computer system so as to perform the following steps:

(i) encoding said plurality of copies each with a separate, unique identification code, said identification code being based on a unique arrangement of the electronically created material on each such copy based on word-shift coding, wherein said word-shift coding includes altering a bitmap image of the document to shift locations of at least one word relative to other words contained in the document to uniquely encode each copy of the document; and, (ii) creating a codebook of a plurality of identification codes to correlate each such identification code to a particular subscriber whereby illicit copies of a document can be traced to the particular subscriber associated with the identification code within the document.

16. A method of deterring the illicit copying of electronically published documents, which comprises:

(a) utilizing a computer system to electronically publish a plurality of copies of a document having electronically created material including standardized print features thereon for distribution to a plurality of subscribers;

(b) operating programming within said computer system so as to perform the following steps:

(i) encoding said plurality of copies each with a separate, unique identification code, said identification code being based on a unique arrangement of the electronically created material on each such copy based on feature-altered coding, wherein said feature-altered coding includes altering a bitmap image of the document to alter at least one print feature relative to said standardized print features; and, (ii) creating a codebook of a plurality of identification codes to correlate each such identification code to a particular subscriber whereby illicit copies of a document can be traced to the particular subscriber associated with the identification code within the document.

17. The method of claim 15, wherein operating said programming also includes performing the steps of:

(iii) creating a first copy of said document as a standard document;

(iv) creating a plurality of subsequent copies, each with at least one alteration rendering it different from said standard document, and each being different from one another so that each of said copies has a unique identification code based on said at least one alteration;

(v) comparing each subsequent copy with said standard document to identify a sequence of same and different aspects of each such copy relative to said standard document; and, (vi) converting said sequence of same and different aspects to a unique binary identification code.

18. The method of claim 16, wherein operating said programming also includes performing the steps of:

(iii) creating a first copy of said document as a standard document;

(iv) creating a plurality of subsequent copies, each with at least one alteration rendering it different from said standard document, and each being different from one another so that each of said copies has a unique identification code based on said at least one alteration;

(v) comparing each subsequent copy with said standard document to identify a sequence of same and different aspects of each such copy relative to said standard document; and, (vi) converting said sequence of same and different aspects to a unique binary identification code.

19. The method of claim 15, wherein said computer system includes a scanner device connected thereto and operating said programming includes performing the steps of:

(1) scanning a copy of a document to feed its image into said computer system;

(2) analyzing each line of said document for word-shift alterations and decoding the image to determine said images unique identification code; and, (3) comparing said images unique identification code to the codebook to determine the particular subscriber to which the identification code correlates.

20. The method of claim 16, wherein said computer system includes a scanner device connected thereto and operating said programming includes performing the steps of:

(1) scanning a copy of a document to feed its image into said computer system;

(2) analyzing each line of said document for feature-altered coding and decoding the image to determine said images unique identification code; and, (3) comparing said images unique identification code to the codebook to determine the particular subscriber to which the identification code correlates.

21. The method of claim 15 wherein operating said programming includes performing the steps of:

(1) receiving a bitmap image for a copy of a previously electronically published document via an electronic inputting device;

(2) analyzing the bitmap image to determine its unique identification code; and (3) comparing the resulting identification code analyzed from the bitmap image to the plurality of identification codes in the codebook to determine the particular subscriber to which the identification code correlates.

22. The method of claim 16 wherein operating said programming includes performing the steps of:

(1) receiving a bitmap image for a copy of a previously electronically published document via an electronic inputting device;

(2) analyzing the bitmap image to determine its unique identification code; and (3) comparing the resulting identification code analyzed from the bitmap image to the plurality of identification codes in the codebook to determine the particular subscriber to which the identification code correlates.

23. The method of claim 4 wherein operating said programming also includes the step of noise reduction comprising salt-and-pepper, deskewing and text-line location.

24. The method of claim 4 wherein said analyzing and decoding is based on baseline differential determinations to determine the distance between adjacent baselines as to whether a text line has been shifted.

25. The method of claim 4 wherein said analyzing and decoding is based on centroid differential determinations.

* * * * *